Patented Feb. 14, 1933

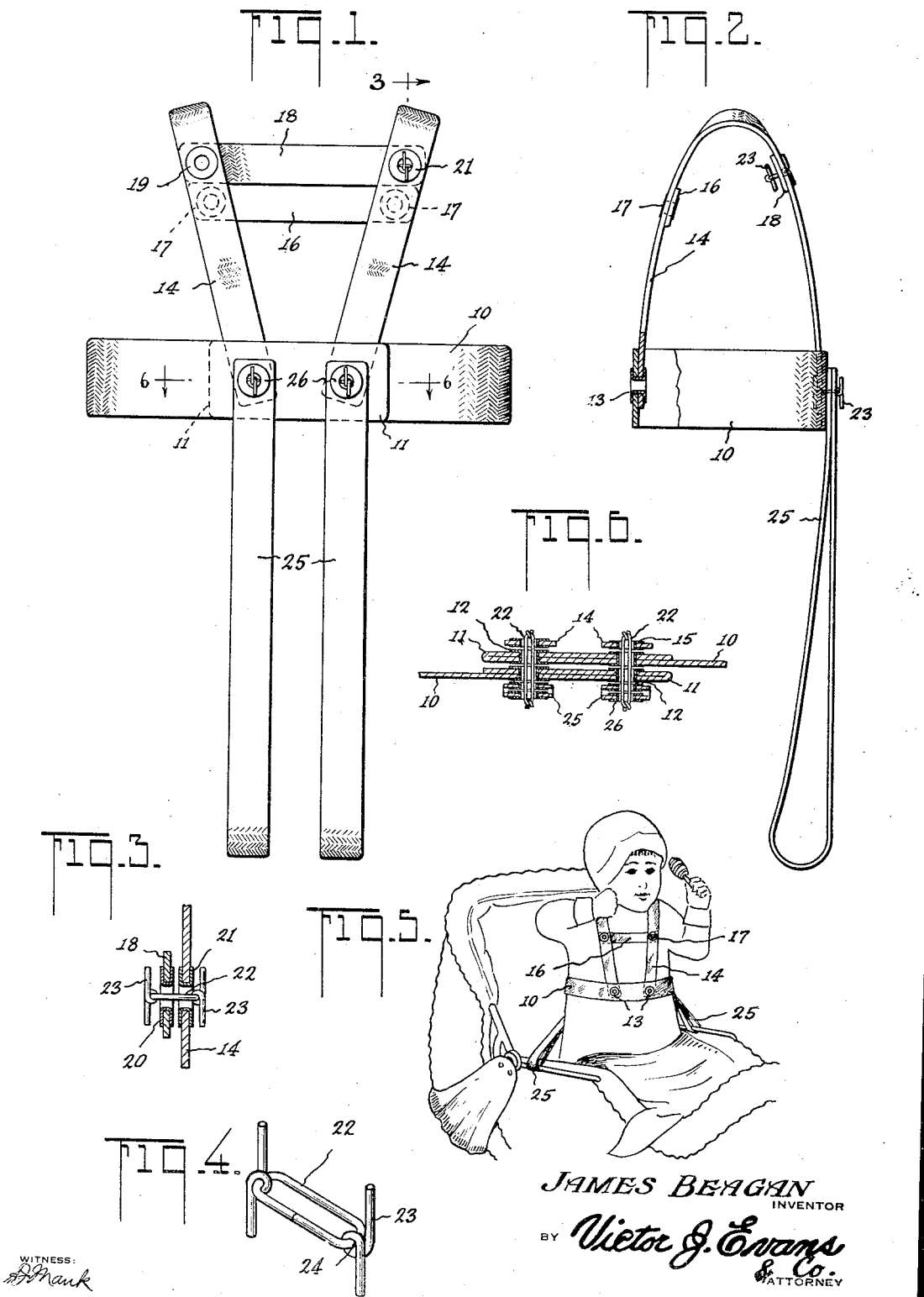

1,897,882

UNITED STATES PATENT OFFICE

JAMES BEAGAN, OF BROOKLYN, NEW YORK

BABY'S SAFETY STRAP AND HARNESS

Application filed March 9, 1931. Serial No. 521,234.

The invention relates to a harness construction and more especially to babies' safety strap and harness.

The primary object of the invention is the provision of a device of this character, wherein the strapping of a baby can be had either in a chair, baby carriage, or other place of rest, so that it will be practically impossible for the baby to free itself with the possibility of injury by a fall or otherwise from the place of rest.

Another object of the invention is the provision of a device of this character, wherein the straps making up the harness are novel in arrangement so that the harness can be applied to and removed from the body of an infant and when applied will enable the retention of such baby or infant either within a highchair, baby carriage, or other place of deposit. The harness when applied is fastened about the body of the infant in a novel manner so that there is no possibility of such infant working loose from the harness or the latter becoming detached in any manner except when it is desired to remove the harness from the infant, the fasteners for the securing of the harness in place being of novel form.

A further object of the invention is the provision of a device of this character wherein the points of connection of the straps of the harness and the retaining straps to secure an infant within a carriage, chair or the like are such that there are no protruding parts which would possibly cause injury to an infant when the harness is applied and the retaining straps engaged with the article occupied by the infant, the fasteners being readily manipulated for the securing of the harness upon the body of the infant and the removal of such harness as well as the retaining straps.

A still further object of the invention is the provision of a device of this character, which is extremely simple in its construction, thoroughly reliable and efficient in its purpose, strong, durable, and inexpensive to manufacture.

With these and other objects in view the invention consists in the features of construction, combination and arrangement of parts as will be hereinafter more fully described in detail, illustrated in the accompanying drawing which discloses the preferred embodiment of the invention, and pointed out in the claims hereunto appended.

In the accompanying drawing:

Fig. 1 is an elevation of the device constructed in accordance with the invention.

Fig. 2 is a side elevation thereof, the waist embracing band or strap being partly broken away.

Fig. 3 is a fragmentary vertical sectional view showing in detail the fastener eyelets and the fastener engaged therein, and this view being taken approximately on the line 3—3 of Fig. 1.

Fig. 4 is a perspective view of the fastener removed from the eyelets.

Fig. 5 is a fragmentary perspective view of a baby carriage showing an infant therein with the device applied both to the infant and to the carriage to hold the infant therein.

Fig. 6 is a sectional view on the line 6—6 of Fig. 1.

Similar reference characters indicate corresponding parts throughout the several views in the drawing.

Referring to the drawing in detail the device comprises preferably a single waist embracing band or strap 10, in this instance preferably made from a woven fabric material, although it may be made from any other suitable material and is flexible, the ends being folded on themselves to provide double ply terminals 11, each having therein spaced eyelets 12, these being riveted or clinched and are of any desirable construction.

Intermediate the length of the band 10 and preferably fixed thereto by eyelets 13 simulating the eyelets 12 are spaced shoulder straps 14, these at their free ends being provided with eyelets 15 simulating the said eyelets 12 and 13. Permanently joined with the shoulder straps is a front cross strap 16, the same being joined to said straps 14 by eyelets 17.

Permanently joined with one shoulder strap 14 is a back cross strap 18, the joining being effected by an eyelet 19 at one end of said strap 18, while mounted in the other end of this strap 18 is an eyelet 20 and at the point of attachment of the said strap 18 with the other shoulder strap 14 is an eyelet 21 corresponding to the eyelets 12 and adapted to be engaged in these eyelets 20 and 21 is a removable fastener which comprises an elongated substantially oval shaped link 22 having swingingly connected thereto at opposite ends retaining members 23, each formed from a single length of wire bent intermediate its ends to provide an eye 24 which loosely engages about the link 22, the link being also made from a single length of wire.

Adapted for detachable connection with the waist band 10 is a pair of retaining straps 25 each of the required length and folded into looped form, the ends being fitted with eyelets 26 corresponding to the eyelets heretofore described. These straps 25 are adapted to encircle or engage with fixtures at opposite sides of a baby carriage as indicated at 27 in Fig. 5 of the drawing and are detachably joined with the waist band 10 by a pair of removable fasteners including the links 22 and the cross bars 23, which pair of fasteners also are designed to join the terminals 11 of the waist band when overlapped by passage through the eyelets in said terminals and the band embracing the waist of an infant on the application of the harness as is shown in Fig. 5 of the drawing. The harness when applied to the infant, which harness includes the band 10, the shoulder straps 11 and the front and back straps 16 and 18, will serve to hold the infant in the carriage 27 to avoid the falling of the infant therefrom with resulting injury to such infant.

It is of course understood that when the harness is worn by the infant and it is desired to strap the child in a chair, the straps 25 are engaged about the arms or rungs of the chair, this being obvious.

The harness is applied to the infant by opening the band 10 and the back strap 18 whereupon such harness can be readily and conveniently applied to the body of the infant.

It should be obvious that the fasteners can be readily detached or removed from the eyelets by aligning or substantially so the cross bars 23 with the link 22 of such fastener, whereupon the fastener can be readily slipped from within the eyelets.

What is claimed as new is:

A harness of the character indicated comprising a waistband having overlapping extremities, eyelets disposed in both portions of the band in the area of the overlap, shoulder straps having one end fixed to the band diametrically opposite the overlap, eyelets in the free ends of said straps and adapted to be positioned in registration with the eyelets of the overlapped area, looped straps for connection with the arms or rungs of a chair, eyelets provided in said looped straps in the ends remote from the loops, and detachable fasteners passing through the eyelets of the looped straps, through the eyelets in the overlapped area of the band and through the eyelets in the shoulder straps, whereby the release of said fasteners will release the free end of the shoulder straps and overlapped ends of the band and disconnect the looped straps from the band.

In testimony whereof I hereby affix my signature.

JAMES BEAGAN.